United States Patent
Ballet et al.

(10) Patent No.: US 9,421,719 B2
(45) Date of Patent: Aug. 23, 2016

(54) PRODUCTION OF A TRANSPARENT OPTICAL COMPONENT HAVING A CELLULAR STRUCTURE

(75) Inventors: Jérôme Ballet, Charenton-le-Pont (FR); Céline Benoit, Charenton-le-Pont (FR); Christian Bovet, Charenton-le-Pont (FR); Jean-Paul Cano, Charenton-le-Pont (FR); Pierre Chavel, Orsay (FR); François Goudail, Orsay (FR)

(73) Assignees: Essilor International (Compagnie Generale D'Optique), Charenton le Pont (FR); Centre National de la Recherche Scientifique, Paris (FR)

( * ) Notice: Subject to any disclaimer, the term of this patent is extended or adjusted under 35 U.S.C. 154(b) by 886 days.

(21) Appl. No.: 13/699,268

(22) PCT Filed: May 16, 2011

(86) PCT No.: PCT/FR2011/051089
§ 371 (c)(1),
(2), (4) Date: Nov. 20, 2012

(87) PCT Pub. No.: WO2011/144852
PCT Pub. Date: Nov. 24, 2011

(65) Prior Publication Data
US 2013/0069258 A1 Mar. 21, 2013

(30) Foreign Application Priority Data
May 21, 2010 (FR) .................................. 10 53977

(51) Int. Cl.
*G02C 7/02* (2006.01)
*B29D 11/00* (2006.01)
*G02C 7/08* (2006.01)
*G02C 7/10* (2006.01)

(52) U.S. Cl.
CPC .......... *B29D 11/00798* (2013.01); *G02C 7/083* (2013.01); *G02C 7/10* (2013.01); *G02C 2202/18* (2013.01)

(58) Field of Classification Search
None
See application file for complete search history.

(56) References Cited

U.S. PATENT DOCUMENTS

| 7,828,430 | B2 * | 11/2010 | Ballet | ...................... G02C 7/02 351/159.01 |
| 2007/0268694 | A1 | 11/2007 | Bailey et al. | |
| 2008/0297720 | A1 | 12/2008 | Ballet et al. | |
| 2009/0115962 | A1 | 5/2009 | Bovet et al. | |
| 2009/0168414 | A1 | 7/2009 | Bailey | |

FOREIGN PATENT DOCUMENTS

| WO | 97/25256 A1 | 7/1997 |
| WO | 2007/148807 A1 | 12/2007 |

* cited by examiner

*Primary Examiner* — Barbara J Musser
(74) *Attorney, Agent, or Firm* — Seed IP Law Group PLLC

(57) ABSTRACT

The invention relates to a transparent optical component having a cellular structure, comprising a network of walls (106), that forms a set of cells (104) that are juxtaposed parallel to a component surface. In order to produce such a component, an irregular set of points (101, 105) in the surface of the component is determined, each point being used to form a center of one of the cells. A position and an orientation of each wall are then determined such that the set of cells forms a Voronoï partition of the surface of the component. The component has a level of transparency that is compatible with an optical or ophthalmological use.

16 Claims, 4 Drawing Sheets

PRODUCTION OF A TRANSPARENT OPTICAL COMPONENT HAVING A CELLULAR STRUCTURE

Figure 1:
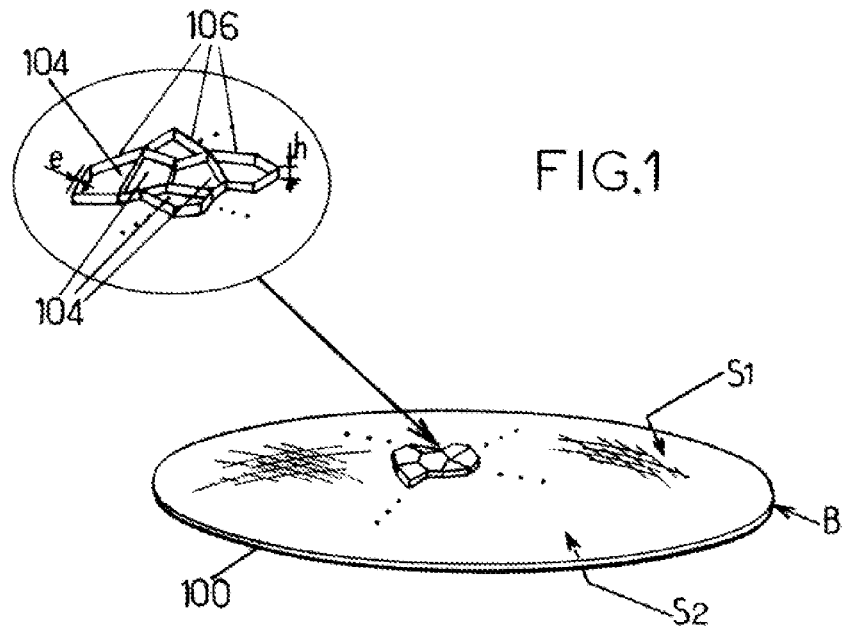

The invention relates to the production of a transparent optical component which contains a set of cells separated by walls. It can be applied to the production of an optical lens, particularly an ophthalmic lens for spectacles.

It is known to produce an optical component in the form of a transparent substrate which supports, on at least one of its sides, a set of adjoining cells at least partially covering that side. Substances having determined optical properties are contained in the cells, and cooperate to give the optical component the desired optical characteristics for a particular application. For example, transparent substances which have different refractive indices may be distributed among the cells, such that the component obtained is a lens blank that corrects ametropia. The lens is then obtained by cutting out the optical component along an outline which corresponds to the eyeglass frame of a lens wearer. After the cells are closed off to retain the substances within the cells, the cutting the optical component does not result in a loss of the substances. The initial optical characteristics of the lens blank are maintained in the cut lens.

Such transparent optical components are of particular interest because a large number of different models can be obtained from the same cell-covered substrate, by varying the optically effective substance(s) placed in the cells. The production of optical components is then particularly economical, because the cell-covered substrates can be mass produced in a factory. These substrates then accept one or more substances with optical properties into the cells, chosen on the basis of the optical characteristics needed to meet customer requirements. Personalization of the optical component for each customer is thus achieved, and can be carried out further down the component distribution chain. The logistics of manufacturing and distribution are thus simplified and flexible, which contributes to an additional reduction in the unit price of each completed optical component provided to a customer. These advantages are particularly significant in the field of ophthalmics, where spectacle lenses, contact lenses, or lens implants must correspond to individual prescriptions which are dependent on the eyesight of each wearer.

In the invention, an optical component is considered to be transparent when an object located on a first side of the optical component can be viewed by an observer located on the other side of the optical component, without a significant loss of contrast. The object and observer are each positioned at a distance from the optical component. In other words, an image of the object is formed through the optical component without a loss of quality in the visual perception. In the invention, this definition of the term transparent applies to all objects that are so referenced in the present description.

Cells near the surface of the optical component are separated by walls. These separating walls prevent the substances contained in the cells from progressively intermingling during the period the optical component is in use. This ensures an almost unlimited service lifetime of the optical component, or an optical element obtained from the component.

Given that each wall has a limited thickness parallel to the surface of the optical component, between 0.1 µm (micrometers) and 5 µm in particular, this causes a microscopic diffraction of the light impinging on the component at the location of the wall. If the walls form a periodic lattice on the surface of the optical component, the portions of the incident light flux which are respectively diffracted by all the walls are combined in certain isolated directions due to the constructive interference effect. A macroscopic diffraction results, producing a concentration of the light transmitted or reflected by the component in several separate directions of emergence. The optical component thus appears dark and then suddenly light to an observer, as its orientation relative to the observer varies and the viewing direction coincides with a diffraction direction. In other words, a flash of light is briefly apparent to the observer, originating from the surface of the optical component. Such a flash is visually unappealing and is unacceptable in the field of ophthalmics.

There are known transparent optical components having cellular structures with curved separating walls between the cells, such as those in document WO 2007/010414. These curved walls limit the phenomenon of macroscopic diffraction. Indeed a curved wall individually diffracts light in multiple planes at staggered angles, such that the concentration of light resulting from the interference between the diffraction contributions from all the walls is reduced. This considerably reduces the appearance of light flashes in isolated directions. However, it is more complex to produce curved walls than straight walls, and filling the cells at the interfaces between curved walls presents additional difficulties.

It is also known to use transparent optical components having a cellular structure in which the cells have a random geometry and random distribution. Again, unstructuring the arrangement of the intercellular walls prevents the concentration in isolated directions of the light diffracted by all the walls. However, optimizing such an arrangement of the intercellular walls requires a succession of simulated annealing steps to obtain a distribution of the diffracted light with a sufficient angular spread. These simulated annealing steps require calculations which are particularly long.

One object of the invention is to eliminate the flashes of light due to diffraction in an optical component having cells separated by walls, using an industrial implementation which is fairly simple and fast.

To this purpose, the invention proposes a method of producing a transparent optical component having a cellular structure, this component comprising a network of walls forming a set of cells juxtaposed parallel to a surface of the component, between its two sides, each wall extending perpendicularly to the surface of the component to separate two adjacent cells, and each wall having a thickness, parallel to the surface of the component, of between 0.1 µm and 5 µm, the method comprising the following steps:

/1/ determining a set of points in the surface of the component with an irregular distribution of these points in the surface, each point being used to form a center of one of the cells; and /2/ determining a position and an orientation of each wall parallel to the surface of the component, such that the network of walls forms a Voronoi partition of the surface of the component, the Voronoi partition consisting of polygons constructed from the centers of the cells, such that the entire network of walls contains at least five walls having different respective orientations parallel to the surface of the component.

"Irregular distribution of points" is understood to mean a distribution which does not form a periodically repeated pattern.

In step /2/, the Voronoi partition of the surface of the component is obtained by plotting the perpendicular bisectors for all the pairs of neighboring points in the set of points determined in step /1/. A wall is then placed on the perpendicular bisector for each pair of neighboring points, between two intersections of this perpendicular bisector with other perpendicular bisectors relative to one of the two points in the pair concerned and to another neighboring point outside this pair. Each cell is then composed from all points which are closer to the center of this cell than to any other cell center. Such a subdivision of the surface of the component can quickly be generated by computer without requiring complex computational resources.

Such a Voronoi partition, when it is applied to the irregular distribution of the cell centers which was determined in step /1/, results in a random distribution of the intercellular walls which effectively attenuates any concentration of the light diffracted by the set of walls.

In order to increase the transparency of the optical component, the set of points forming the cell centers may advantageously be determined in step /1/ such that an angular distribution characteristic of the light diffused by the component, with the walls as determined in step /2/, is minimal or is less than a predetermined threshold. To this purpose, the diffused light is produced from a beam of parallel light rays illuminating the component.

"Angular distribution characteristic of the light diffused" is understood to mean a physical quantity having a value dependent on the angular direction relative to the optical component. In other words, the characteristic in question, when it is measured at a given location in the component, depends on the angle between a first line passing through a light source and the location concerned in the component, and a second line which passes through this location in the component and a light detector.

Advantageously, minimizing such a characteristic allows increasing the level of transparency of the component relative to an initial level. The obtained level of transparency may also be compared to a predetermined threshold. Such a threshold can then constitute the maximum acceptable value for the angular distribution characteristic of the light diffused.

In a preferred embodiment of the invention, the angular distribution characteristic of the light diffused may be an amplitude of a first-order diffraction peak. Such a choice is particularly advisable because the first-order diffraction peak is generally larger than the higher order diffraction peaks. In other words, the amplitude of the first-order diffraction peak is a criterion suitable for evaluating the transparency of the optical component.

In a first type of embodiment of the invention, the points that are to be used to form the cell centers may be directly determined in step /1/ with an irregular distribution in the surface of the component.

In a second type of embodiment of the invention, step /1/ may comprise the following sub-steps:
/1-1/ selecting a first irregular distribution in the surface of the component for the points that are to be used to form the centers of the cells, then
/1-2/ moving at least one of these points relative to the initial position of this point in the first irregular distribution, in order to obtain the irregular distribution for the set of points to which step /2/ is applied.

The additional sub-step /1-2/ allows achieving an even more irregular distribution of the cell centers than in the first embodiment. The reduction or elimination of any flashes of light that could be produced by the optical component is then even more efficient.

In these two types of embodiments of the invention, the density of the irregular distribution of points in the surface of the component, in the initially selected distribution, may depend on a gradient of an optical function that is to be performed by the component. The cell structure ultimately obtained after applying the method of the invention is then adapted to the optical function of the component.

A third type of embodiment of the invention may be obtained by replacing the irregular distribution of the points that are to form the cell centers, in sub-step /1-1/, by a regular distribution. Sub-step /1-1/ is then very simple to execute by computer, and sub-step /1-2/ then ensures that the ultimately obtained subdivision of the component surface into cells is irregular enough to obtain a sufficient level for the transparency of the component.

Preferably, a translation vector for each point moved in sub-step /1-2/ may be determined randomly or pseudo-randomly, for an orientation and length of this translation vector that are parallel to the surface of the component, with its length also being limited by the surface of the component.

"Pseudo-random determination" is understood to mean a method which applies computer algorithms simulating a random determination.

The method may additionally comprise filling each cell with a transparent substance having a variable refractive index, such that at least some of the cells produce variable phase shifts for the light rays passing through these cells between the two opposite sides of the component. The substances contained in different cells may also have variable light absorptions.

Lastly, the invention may be applied to the production of various optical or ophthalmological components. In particular, the optical component may comprise a lens, or a film intended to be applied onto a transparent substrate to form a lens. More particularly, the lens may be an ophthalmic lens for spectacles. For these applications, the level of transparency of the optical component is an essential characteristic of the final product. In addition, for ophthalmic applications, eliminating visible light flashes from the component for an observer satisfies the aesthetic requirements specific to this field.

Figure 2:
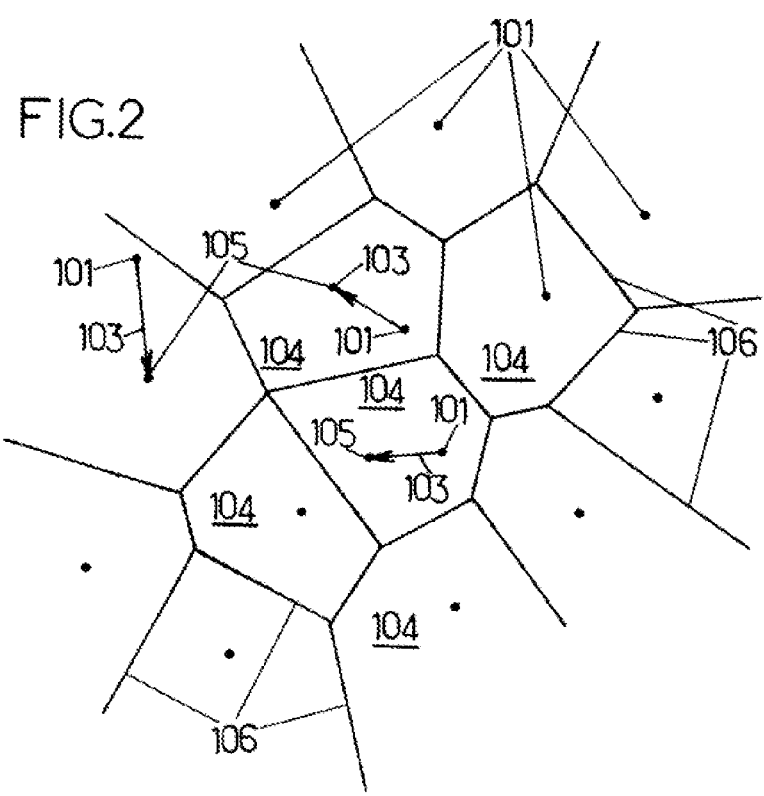
Figure 3:
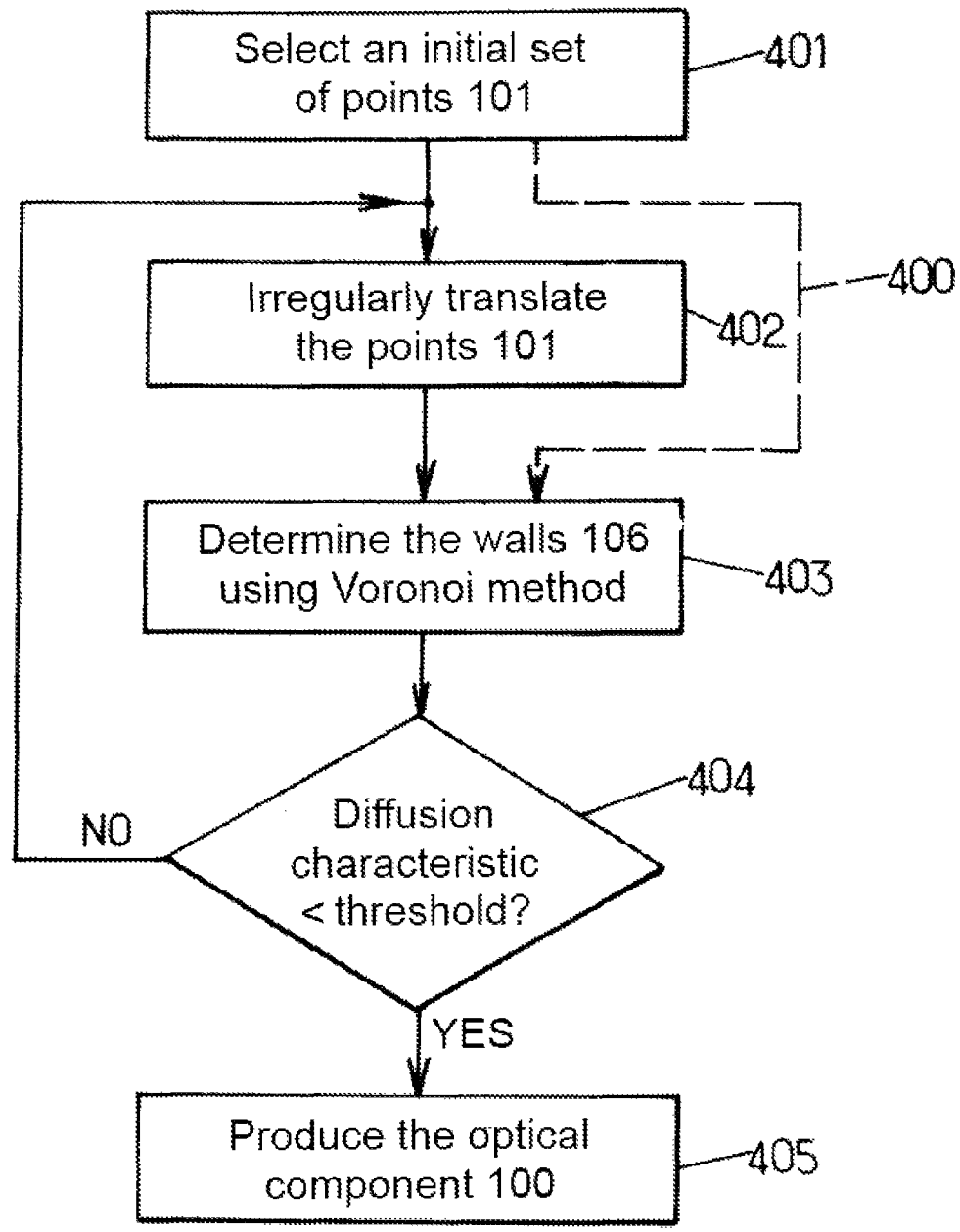
Figure 4B:
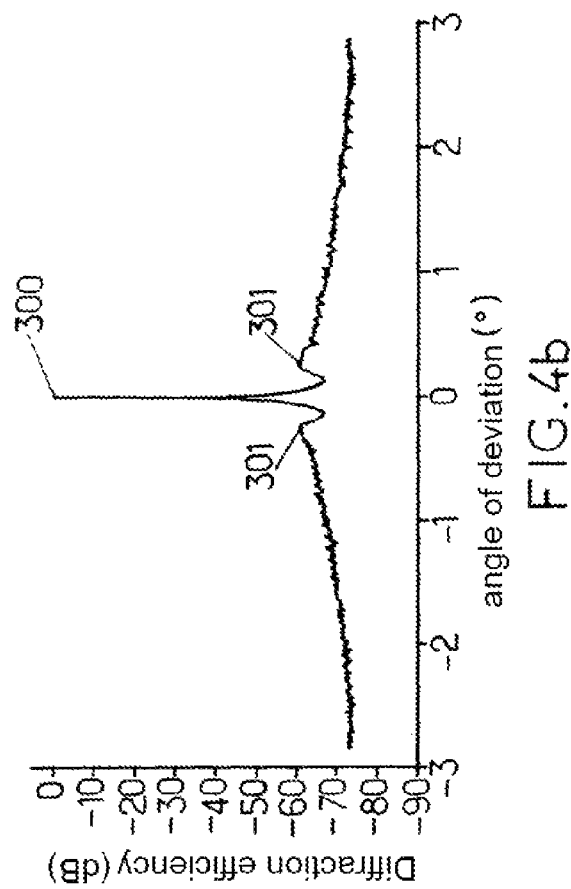
Figure 4A:
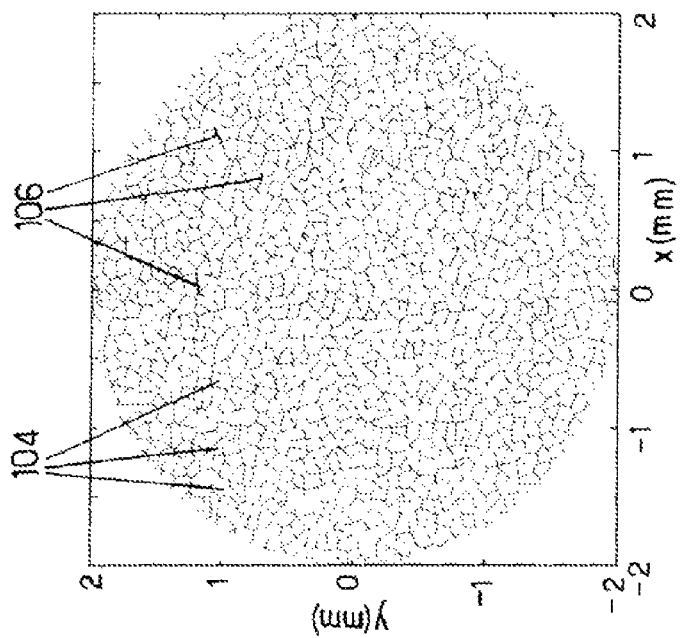
Figure 5A:
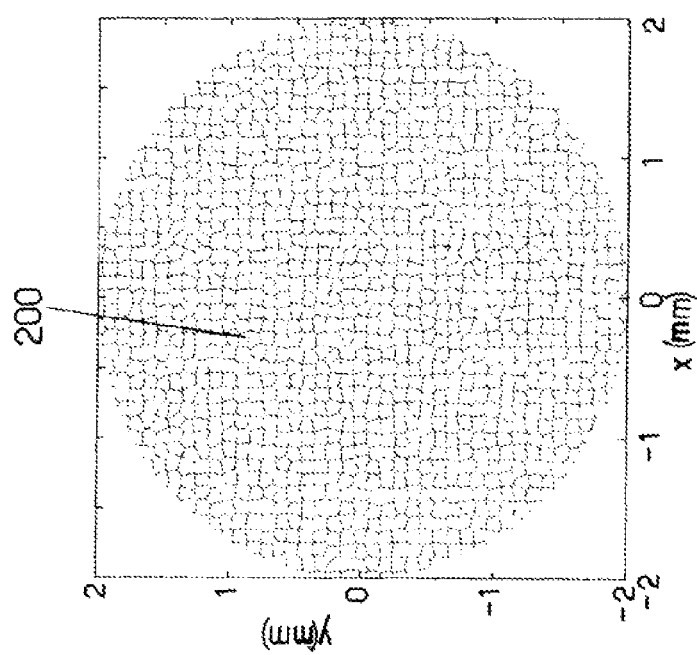
Figure 5B:
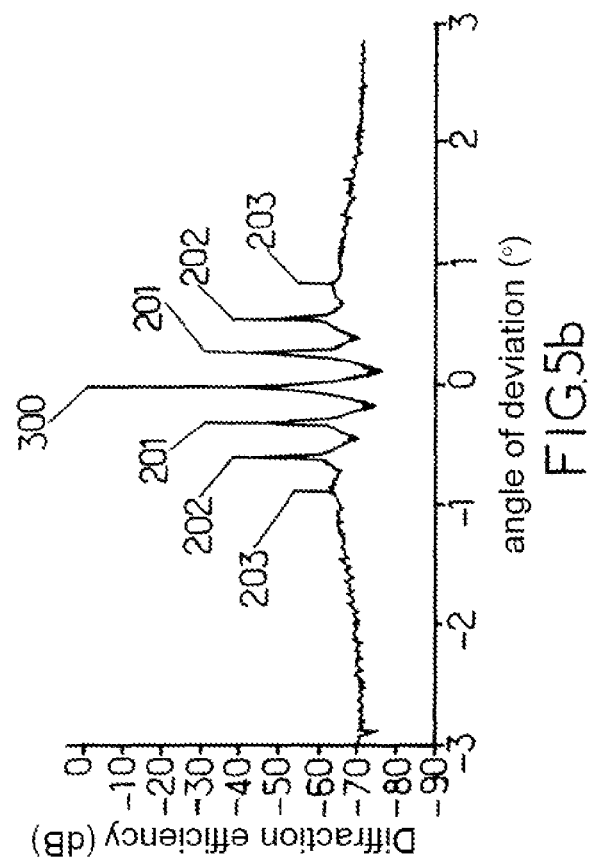

Other features and advantages of the invention will be apparent from the following description of some non-limiting examples, with reference to the attached drawings in which:

FIG. 1 shows a transparent optical component to which the invention can be applied, FIG. 2 illustrates a portion of a cellular structure produced according to the invention, FIG. 3 is a block diagram of the steps of the method in a particular embodiment of the invention, FIG. 4a reproduces a cellular structure of an optical component produced according to the invention, FIG. 4b reproduces a light diffusion diagram for the optical component of FIG. 4a, and FIGS. 5a and 5b respectively correspond to FIGS. 4a and 4b, for another embodiment of the invention.

For sake of clarity, the dimensions of the elements represented in FIGS. 1 and 2 do not correspond to actual dimensions nor to ratios between actual dimensions. In addition, the same references in different figures indicate the same elements or those with identical functions.

As illustrated in FIG. 1, an optical component 100 may be an ophthalmic lens with a front side $S_1$ and a rear side $S_2$. In the case illustrated, side $S_1$ is convex and side $S_2$ is concave. One of the two sides $S_1$ or $S_2$, for example side $S_1$, supports a network of walls 106 which each extend perpendicularly to side $S_1$ with a wall height h which may be identical for all walls. The walls 106 may be directly on a base substrate of the lens 100, or on a transparent film which is on the base substrate. The walls 106 divide the side $S_1$ into a set of cells 104, in which two neighboring cells 104 are separated from each other by a wall 106.

The sides $S_1$ and $S_2$ are delimited by a peripheral edge B, which may be circular with a diameter of 65 mm (millimeters)

when the lens 100 is to be trimmed to form a spectacle lens for assembly in an eyeglass frame.

Each wall 106 has a thickness e, parallel to side $S_1$, which may be between 0.1 μm (micrometers) and 5 μm. Because of this thickness e, the visible light passing through the lens 100 between sides $S_1$ and $S_2$ at any of the walls 106 is diffracted. The cumulative diffraction for all the walls 106 may result in a concentration of the light transmitted or reflected by the lens 100 in different directions. This is particularly the case when the network of walls 106 is regular or periodic. To avoid such an angular concentration of the light transmitted or reflected, the invention as described with reference to FIGS. 2 and 3 concerns the determination of an irregular network for the walls 106 on side $S_1$ of the lens 100.

An irregularly distributed set of points 101 is first determined on side $S_1$ of the lens 100. The distribution of points 101 forms no basic pattern such as a square, rectangle, triangle, or hexagon when mapped onto side $S_1$. Several methods may alternatively be used for obtaining such an irregular distribution of the points 101.

In a first method, the points 101 are selected initially with a distribution which is already irregular during step 401 of FIG. 3. In this case, the method can be directly continued in step 403, in the sequence indicated by the reference 400.

In a second method, the points 101 are selected initially during step 401 according to any distribution in side $S_1$, then are irregularly translated on side $S_1$ during a separate step 402. This separate step 402 ensures that the final distribution of the points 101 is irregular, no matter what initial distribution of the points 101 is adopted in step 401. In this second method, the points 101 may then be initially selected, in step 401, according to a distribution which is regular, or is already irregular, random or pseudo-random. In particular, when the distribution is initially regular when exiting step 401, the distribution of points 101 may have a lattice pattern that is square, rectangular, equilateral triangular, or hexagonal.

In step 402, translation vectors 103 are determined in a random or pseudo-random manner, and are applied to at least a portion of the points 101. The points 101 translated in this manner may be selected randomly, or all the points 101 may be translated. The points 101 which are translated are denoted 105 in FIG. 2. However, for clarity, these points 105 which result from the translations in step 402 are subsequently referred to as 101, because in the rest of the method they replace the points 101 that resulted from step 401. Of course, each translation vector 103 has a limited length so that the point 105 is still within side $S_1$, which itself is limited by its peripheral edge B.

When step 402 is applied to a regular initial distribution of the points 101, the translation vectors 103 can be determined to each have a maximum length of between 0.5 and 2.5 times the lattice parameter of the regular initial distribution of the points 101. Thus step 402 introduces an irregularity into the distribution of points 101, while limiting variations in local density for these points in side $S_1$.

For the two methods corresponding to the sequences of 401 then 400 for the first method, or steps 401 then 402 for the second method, the points 101 may initially be selected in step 401 with a local density which depends on a gradient of an optical function of the lens 100. A higher density for the cells 104 is more suitable for achieving significant variations in a function which varies discretely between neighboring cells 104, by simulating a continuous variation of this function. Such a function may be, for example, a level of light absorption of the lens 100, a light refraction index of a layer formed by the set of cells, etc.

During step 403, the perpendicular bisectors of pairs of neighboring points 101 are determined. A cell is thus constructed for each point 101, which contains this point 101 and which is the smallest portion of side $S_1$ delimited by these perpendicular bisectors. The partitioning of side $S_1$ in this manner corresponds to a Voronoi partition into separate cells 104. Each point 101 is the center of a cell 104. The irregularity of the distribution of points 101, at the end of step 401 or step 402, ensures that the positions and orientations of the walls 106 are irregular. In particular, the network of walls 106 contains at least five walls which have different orientations, parallel to side $S_1$. The network of walls 106 is thus sufficiently irregular to prevent the appearance of constructive interferences produced by the diffraction of light by the walls 106, apparent to a moving observer as a light flash from the lens 100.

FIG. 4a reproduces a network of walls 106 which was determined in the manner just described, from an initial square distribution of the points 101 with the length of the translation vectors 103 limited to 1.27 times the lattice parameter of the square lattice. The square lattice parameter of the initial network of points 101 is equal to 100 μm, and all the walls 106 have a thickness of 5 μm. x and y denote two perpendicular axes which define the reference system for each point on side $S_1$. The coordinates of the x and y axes are expressed in millimeters (mm).

FIG. 4b reproduces a diffraction diagram for the lens 100 which corresponds to FIG. 4a. The x axis is the angle of deviation, expressed in degrees (°), of a beam of parallel light rays sent through the lens 100. The y axis indicates the diffraction efficiency of the entire lens 100, expressed in decibels (dB), for each deviation value. This diffraction efficiency is equal to the intensity of the diffracted light for a particular deviation angle, divided by the intensity of the incident beam of light directed onto the lens 100. The central peak 300 corresponds to the transmission through the lens 100 without deviation from the incident direction of the beam. The two lateral peaks 301 correspond to the angular deviation of first order diffraction.

As a comparison, FIGS. 5a and 5b respectively correspond to FIGS. 4a and 4b, limiting the length of the translation vectors 103 to 0.5 times the lattice parameter of the square lattice. For these FIGS. 5a and 5b, the lattice parameter of the initial square lattice of points 101 is again equal to 100 μm, and all the walls 106 again have a thickness of 5 μm.

FIG. 5b shows a set of diffraction peaks which comprises the zero order diffraction peak which is again denoted 300, two first order diffraction peaks which are denoted 201, two second order diffraction peaks which are denoted 202, and two third order diffraction peaks which are denoted 203. Diffraction peaks higher than third order are not shown. The peaks 201, 202 and 203 are presented in pairs, for symmetry.

Comparing FIGS. 4b and 5b, it appears that the increase in the maximum length of the translation vectors 103 causes the second and third order diffraction peaks to disappear, and attenuates the first order diffraction peak. The amplitude of peaks 201 and 301, corresponding to the first order diffraction, can therefore be taken as an indicator of improvement of the transparency of the lens 100 which is obtained by the invention.

During a step 404 (FIG. 3), this first order diffraction amplitude can be compared to a predetermined threshold. If it is still greater than this threshold, steps 402 and 403 of the method can be repeated, either by increasing the maximum length of the translation vectors 103, or by re-executing step 402 using the points 101 and 105 resulting from the previous execution of step 402.

When the amplitude of the first order diffraction peaks becomes less than the predetermined threshold, the network of walls 106 which is then determined is definitive, and the lens 100 can be produced in step 405 with walls 106 arranged according to this network.

Another indicator of the improvement of the transparency of the lens 100 which is obtained by the invention could be the depth of the diffraction efficiency trough between the zero and first order peaks.

The cells 104 which are delimited by the walls 106 may be filled with an optical substance, to an individual fill level which corresponds to the value of the optical function of the lens 100 at the point 101 constituting the center of each cell 104. The optical fill substance used may vary between different cells 104. For example, each cell 104 may be filled with a transparent substance that has a variable refractive index, such that the cells 104 produce variable phase shifts for the light rays passing through them between the two sides $S_1$ and $S_2$ of the lens 100. Each cell 104 can be filled to achieve a phase shift target value which has been determined for the point 101 constituting the center. It is thus possible to give the lens 100 additional optical power, in addition to an initial optical power determined by a difference between the respective curvatures of sides $S_1$ and $S_2$.

The invention claimed is:

1. A method, comprising
producing a transparent optical component having a cellular structure, adapted to provide a view of an object located on a first side of the component and at a first distance from said component, for a user situated on a second side of the component opposite the first side and at a second distance from said component, the component comprising a network of walls forming a set of cells juxtaposed parallel to a surface of the component, between the first and second sides, each wall extending perpendicularly to the surface of the component to separate two adjacent cells, and each wall having a thickness, parallel to the surface of the component, of between 0.1 µm and 5 µm, said producing including:
/1/ determining a set of points in the surface of the component with an irregular distribution of said points in said surface, each point being used to form a center of one of the cells; and
/2/ forming a Voronoi partition of said surface of the component, forming the Voronoi partition including determining a position and an orientation of each wall parallel to the surface of the component, said Voronoi partition including polygons constructed from the centers of the cells, such that said network of walls contains at least five walls having different respective orientations parallel to the surface of the component, wherein the optical component comprises an ophthalmic lens for spectacles, or a film configured to be applied to a transparent substrate to form an ophthalmic lens for spectacles.

2. A method according to claim 1, wherein the set of points forming the centers of the cells is determined in step /1/ such that an angular distribution characteristic of the light diffused by the component, with the walls as determined in step /2/, is minimal or is less than a predetermined threshold, said diffused light being produced from a beam of parallel light rays illuminating the component.

3. A method according to claim 2, wherein the angular distribution characteristic of the light diffused is an amplitude of a first-order diffraction peak.

4. A method according to claim 2, wherein the points used to form the centers of the cells are directly determined in step /1/ with an irregular distribution in the surface of the component.

5. A method according to claim 4, wherein the irregular distribution of points in the surface of the component have a density that depends on a gradient of an optical function that is to be provided by the component.

6. A method according to claim 2, wherein step /1/ comprises the following sub-steps:
/1-1/ selecting a first irregular distribution in the surface of the component for the points that are to be used to form the centers of the cells, then
/1-2/ moving at least one of the points that are to be used to form the center of one of the cells, said movement being relative to an initial position of said point in the first irregular distribution, in order to obtain the irregular distribution for the set of points to which step /2/ is applied.

7. A method according to claim 6, wherein a density of the first irregular distribution of points in the surface of the component, selected in sub-step /1-1/, depends on a gradient of an optical function that is to be performed by the component.

8. A method according to claim 6, wherein a translation vector for each point moved in sub-step /1-2/ is determined in a random or pseudo-random manner, for an orientation and a length of the translation vector parallel to the surface of the component, with said translation vector having a length limited by said surface of the component.

9. A method according to claim 2, wherein step /1/ comprises the following sub-steps:
/1-1/ selecting a regular distribution in the surface of the component for the points that are to be used to form the centers of the cells, then
/1-2/ moving at least one of the points that are to be used to form the center of one of the cells, said movement being relative to the initial position of said point in the regular distribution, in order to obtain the irregular distribution for the set of points to which step /2/ is applied.

10. A method according to claim 9, wherein the regular distribution of points in the surface of the component, selected in sub-step /1-1/, has a lattice pattern chosen from among a square, rectangular, equilateral triangular, or hexagonal pattern.

11. A method according to claim 9, wherein a maximum length of a translation vector for each point moved in sub-step /1-2/ is between 0.5 and 2.5 times the lattice parameter of the regular distribution selected in sub-step /1-1/.

12. A method according to claim 1, additionally comprising a filling of each cell with a transparent substance having a variable refractive index, such that at least some of the cells produce variable phase shifts for the light rays passing through said cells between the first and second sides of the component.

13. A method according to claim 12, wherein each cell is filled such that the phase shift produced by said cell corresponds to a phase shift target value determined for the center of the cell.

14. A method, comprising
producing a transparent optical component having a cellular structure, adapted to provide a view of an object located on a first side of the component and at a first distance from said component, for a user situated on a second side of the component opposite the first side and at a second distance from said component, the component comprising a network of walls forming a set of cells juxtaposed parallel to a surface of the component, between the first and second sides, each wall extending perpendicularly to the surface of the component to separate two adjacent cells, and each wall having a thickness, parallel to the surface of the component, of between 0.1 µm and 5 µm, said producing including:
/1/ determining a set of points in the surface of the component with an irregular distribution of said points in said surface, each point being used to form a center of one of the cells; and
/2/ forming a Voronoi partition of said surface of the component, forming the Voronoi partition including determining a position and an orientation of each wall parallel to the surface of the component, said Voronoi partition including polygons constructed from the centers of the cells, such that said network of walls contains at least five walls having different respective orientations parallel to the surface of the component, wherein:
the set of points forming the centers of the cells is determined in step /1/ such that an angular distribution characteristic of the light diffused by the component, with the walls as determined in step /2/, is minimal or is less than a predetermined threshold, said diffused light being produced from a beam of parallel light rays illuminating the component;
step /1/ comprises the following sub-steps:
/1-1/ selecting a first irregular distribution in the surface of the component for the points that are to be used to form the centers of the cells, then
/1-2/ moving at least one of the points that are to be used to form the center of one of the cells, said movement being relative to an initial position of said point in the first irregular distribution, in order to obtain the irregular distribution for the set of points to which step /2/ is applied; and
a density of the first irregular distribution of points in the surface of the component, selected in sub-step /1-1/, depends on a gradient of an optical function that is to be performed by the component.

15. A method, comprising
producing a transparent optical component having a cellular structure, adapted to provide a view of an object located on a first side of the component and at a first distance from said component, for a user situated on a second side of the component opposite the first side and at a second distance from said component, the component comprising a network of walls forming a set of cells juxtaposed parallel to a surface of the component, between the first and second sides, each wall extending perpendicularly to the surface of the component to separate two adjacent cells, and each wall having a thickness, parallel to the surface of the component, of between 0.1 µm and 5 µm, said producing including:
/1/ determining a set of points in the surface of the component with an irregular distribution of said points in said surface, each point being used to form a center of one of the cells;
/2/ forming a Voronoi partition of said surface of the component, forming the Voronoi partition including determining a position and an orientation of each wall parallel to the surface of the component, said Voronoi partition including polygons constructed from the centers of the cells, such that said network of walls contains at least five walls having different respective orientations parallel to the surface of the component; and
a filling of each cell with a transparent substance having a variable refractive index, such that at least some of the cells produce variable phase shifts for the light rays passing through said cells between the first and second sides of the component.
16. A method according to claim 15, wherein each cell is filled such that the phase shift produced by said cell corresponds to a phase shift target value determined for the center of the cell.

\* \* \* \* \*